United States Patent [19]

Arnoldt

[11] 4,218,079
[45] Aug. 19, 1980

[54] FLANGE TYPE DUCT JOINT ASSEMBLY
[75] Inventor: Peter J. Arnoldt, Puce, Canada
[73] Assignee: Ductmate Industries, Inc., Pittsburgh, Pa.
[21] Appl. No.: 872,644
[22] Filed: Jan. 26, 1978
[51] Int. Cl.$^2$ ............................................. F16L 23/00
[52] U.S. Cl. .................................. 285/331; 285/363; 285/424
[58] Field of Search ................ 285/331, 363, 369, 424
[56] References Cited
U.S. PATENT DOCUMENTS

| 3,246,918 | 4/1966 | Burghurt | 285/424 |
| 3,630,549 | 12/1971 | Grimm | 285/424 X |
| 3,712,650 | 12/1973 | Mez | 285/424 X |

FOREIGN PATENT DOCUMENTS

| 1212356 | 10/1966 | Fed. Rep. of Germany . | |
| 2221312 | 11/1973 | Fed. Rep. of Germany | 285/424 |
| 2258680 | 6/1974 | Fed. Rep. of Germany | 285/414 |
| 2353625 | 5/1975 | Fed. Rep. of Germany . | |
| 2434160 | 1/1976 | Fed. Rep. of Germany . | |
| 2501611 | 7/1976 | Fed. Rep. of Germany | 285/424 |
| 2556167 | 6/1977 | Fed. Rep. of Germany | 285/424 |
| 1294859 | 1/1972 | United Kingdom | 285/331 |

Primary Examiner—Dave W. Arola
Attorney, Agent, or Firm—Stanley J. Price, Jr.; John M. Adams

[57] ABSTRACT

A joint assembly for connecting the ends of a pair of generally rectangular sheet metal duct sections includes a pair of frame members secured to each other and connected to the respective duct end portions. The frame members each have four flange portions with an upstanding channel shaped leg and an angularly extending duct receiving leg. Four angular corner pieces extend into the adjacent channel portion of the upstanding legs to form the generally rectangular frame. The end portions of the ducts are positioned in longitudinal openings in the duct receiving leg and are rigidly secured thereto by spot welding or the like. The frame members connected to the ducts are secured to each other by bolts or the like extending through adjacent corner pieces to rigidly connect the ends of adjacent duct sections. The upstanding channel shaped leg of the angle flange portion has an inturned rebent portion that forms a longitudinal pocket between the rebent portion and the lower wall of the duct receiving leg. A longitudinally extending gasket is positioned in the pocket in sealing relation with the end of the duct wall. The corner pieces have angularly extending legs with longitudinal concave recessed portions therein that exert a force along the transverse dimension of the legs and prevent the inturned rebent portion from bending away from the duct end wall.

9 Claims, 12 Drawing Figures

FLANGE TYPE DUCT JOINT ASSEMBLY

BACKGROUND OF THE INVENTION

1. Field of the Invention

This invention relates to a joint assembly for sealingly connecting the ends of a pair of sheet metal duct sections and more particularly to a joint assembly that includes a pair of frame members having flange portions secured to each other by angular corner pieces.

2. Description of the Prior Art

U.S. Pat. No. 3,712,650 discloses a flange connection for connecting the ends of rectangular air conditioning ducts that includes flange portions having a horizontal leg portion secured to the end portion of the duct and a vertical channel shaped leg for receiving the arms of an angular corner piece. A wall of the horizontal flange portion has a sloping intermediate portion that permits visual access to the bend areas between the adjacent walls of the duct and the ends of the duct walls.

The angular corner pieces have arm portions that extend into an opening in the vertical channel sloped flange. The arm portions are so dimensioned vertically that the lower surface of the arms abut the lower wall of the horizontal flange. With this arrangement, the end of the duct wall abuts or rests against a surface of the corner piece arm extending into the channel shaped opening.

Another joint assembly for connecting the ends of a pair of ducts is disclosed in German Application No. P 25 56 167 filed Dec. 13, 1975, and includes a plurality of flange portions secured to the ends of the ducts and angular corner pieces positioned in vertically extending channel shaped openings in the respective flange portions to form a generally rectangular frame secured to the ends of the ducts. The flange portions each have a generally horizontal duct receiving leg and a vertical channel shaped leg. The duct receiving leg portion has a longitudinal opening for receiving the duct end walls and one wall of the vertically extending channel shaped leg portion has an inturned or inwardly rebent portion that forms longitudinally an extending lip spaced from the lower wall of the horizontal duct receiving leg. The duct end portion is arranged to extend into the space between the longitudinally extending lip and the lower wall of the horizontal duct receiving leg. In position, the duct end wall abuts the inner surface of the outer vertical wall of the upstanding channel shaped leg. The arm of the corner piece is arranged to extend into the opening above the inturned lip so that the corner piece arm portion is spaced from the duct end wall by the inturned lip portion. The corner pieces have arms with a curved configuration so that pairs of facing arms in adjacent frames are intended to exert a joinder pressure on the respective frames when the corner pieces are bolted to each other.

In the above joint assemblies, the duct end walls abut either the arms of the corner pieces or abut the inner surface of the frame channel shaped leg portion outer vertical wall. Where the end of the duct wall rests against the arm of the corner section, a space is provided between a substantial portion of the outer vertical wall of the channel shaped leg and the end of the duct wall. Where the end of the duct wall is positioned in the space between the inturned lip and the horizontal bottom wall, the duct end wall abuts the portion of the vertical wall of the frame section between the lip and the horizontal bottom wall. In either instance, irregularities on the surface of the duct or on the surface of the frame portions permit leakage of the air from the duct through the flange connection. Positioning gasket material on the outer surface of the frame portions does not eliminate this air leakage since the leakage is occurring within the frame portions and around the duct end wall.

Another problem encountered with the joint assemblies of the prior art is the inability to compensate for the variations in the gauge or dimension of the sheet metal forming both the duct and the frame flange portions. For example, a 20 gauge duct is commercially acceptable if it has a dimension of between 0.906 and 1.106 millimeters. In certain instances, there will be a variation of 0.2 millimeters between the various metal surfaces forming the duct and joint assembly and it is readily apparent with such a variation that air leakage is likely to occur.

Both the duct members and the frame members are galvanized and have an irregular surface caused by the galvanizing process so that the thickness of the sheet metal can vary plus or minus 10 percent. Where there are three layers of sheet metal, as for example in the above discussed joint assemblies, the error increases to plus or minus 30 percent of the sheet metal thickness. Again, it is readily apparent that leakage between the duct and the joint assembly is likely to occur.

In the embodiment where an inturned lip is formed in the outer wall of the vertical leg above the lower wall of the horizontal leg, the distance between the lip and the lower wall is so dimensioned as to fit only one gauge of sheet metal. The frame sections having this fixed dimension cannot be utilized with ducts having different metal thickness.

There is a need for a joint assembly that may be utilized with ducts of different thickness and capable of providing an effective seal between the duct end wall and the inner surface of the flange sections.

SUMMARY OF THE INVENTION

This invention relates to a flange type duct joint assembly arranged to connect the end portions of generally rectangular ducts that include a plurality of flange portions connected to adjacent flange portions by angular corner pieces to form a generally rectangular frame. The flange portions have an upstanding channel shaped leg portion with a front wall and a rear wall forming a longitudinal opening therebetween. The flange portions have a duct receiving leg portion with a top wall and a bottom wall. The top wall abuts the bottom wall and is arranged to receive an end portion of a duct therebetween. The bottom wall extends angularly from the channel shaped leg portion front wall. Gasket means is positioned in the upstanding channel shaped leg portion longitudinal opening adjacent the duct receiving leg bottom wall. The gasket means is adapted to be positioned between the duct end portion and the upper surface of the duct receiving leg bottom wall to sealingly connect the duct end portion to the frame flange portion.

Other features of the invention include the tear drop configuration of the longitudinally extending inturned rebent portion of the upstanding channel shaped leg portion outer wall. The tear drop configuration maintains the gasket material in a pocket formed by the inturned rebent portion and the duct receiving leg bottom wall to insure that the duct end portion will be sealingly engaged to the flange portion to thereby minimize air leakage between the duct end portion and the frame flange portions.

The configuration of the angular corner pieces also contributes to the effective joint assembly between adjacent ducts. The angular corner piece has an outer surface with a concave recessed portion extending along the leg portions and the body portion therebetween. The leg portions with the recessed portions have a transverse dimension substantially equal to the transverse dimension of the opening in the channel shaped leg portion. The elevational dimension of the leg portion preferably extends from the inner surface of the channel shaped leg portion horizontal wall to the surface of the tear drop inwardly rebent portion of the upstanding channel shaped leg to thus provide planar contact between a substantial portion of the leg and the inner surface of the channel shaped upstanding leg. The concave surfaces of the leg members are positioned at assembly in face to face relation so that forces exerted by the securing bolts on the convex sides of the angular corner pieces tends to increase the forces in the vertical direction to urge the upper and lower surfaces of the leg portion into greater contact with the inner surface of the horizontal top wall and the upper leg of the inturned rebent portion.

The surfaces of the leg portions of the angular corner pieces are in the same plane and are parallel to and angularly displaced from the surfaces of a section of the angular corner piece body portion located at the connecting corner. The intermediate portion of the body portion extends angularly from the section at this connecting corner to the respective leg portion. The angular displacement between the connecting corner portion and the leg portion is slightly greater than the thickness of the frame portion vertical leg outer wall. With this arrangement during assembly, the surfaces of the angular corner piece connecting corner portions are in abutting relation while the leg portions are spaced from each other a distance slightly greater than the thickness of the frame upstanding leg outer walls. Upon assembly, the tightening of the bolts extending through the mating apertures in the angular corner piece connecting corner portions exerts a clamping force on the corner piece leg portions to further engage the abutting frames to each other.

Accordingly, the principal object of this invention is to provide a frame like joint assembly for generally rectangular ducts that sealingly engages the end portions of the ducts to the frames.

Another object of the invention is to provide a joint assembly in which the frames are arranged to sealingly engage the end portions of ducts having different thicknesses.

These and other objects of the present invention will be more completely described and disclosed in the following specification, the accompanying drawings and the appended claims.

DESCRIPTION OF THE PREFERRED EMBODIMENTS

Figure 1:
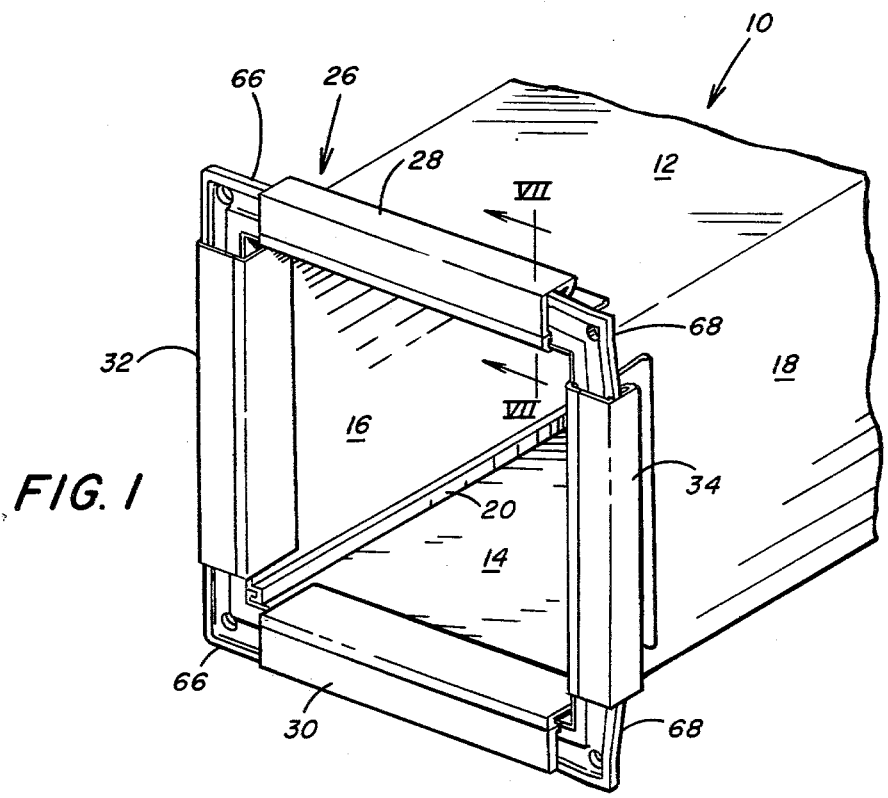
FIG. 1 is a perspective view of a duct section with the frame member connected thereto. For illustrative purposes, a pair of the angular corner pieces are illustrated as being generally planar and a second pair of angular corner pieces are illustrated with an angularly displaced configuration.
Figure 3:
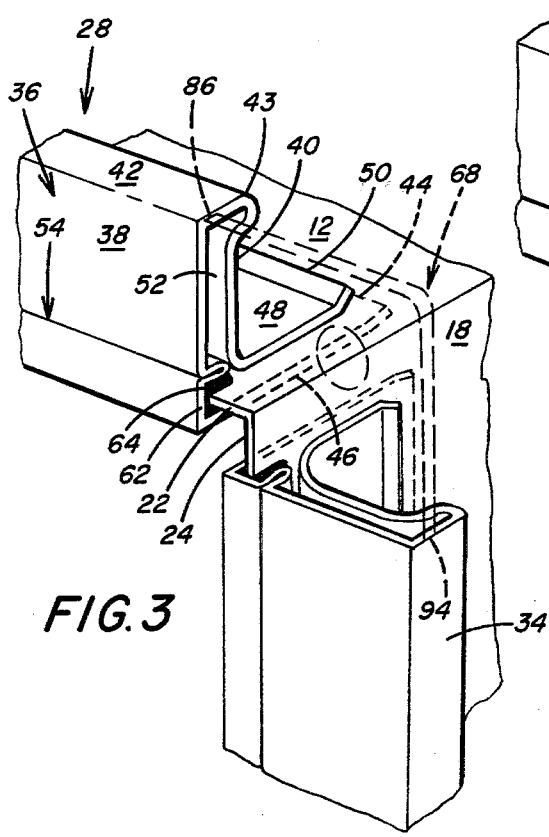
FIG. 3 is a perspective view of a corner of a duct with the flange portions connected thereto and the corner piece illustrated in phantom.
Figure 2:
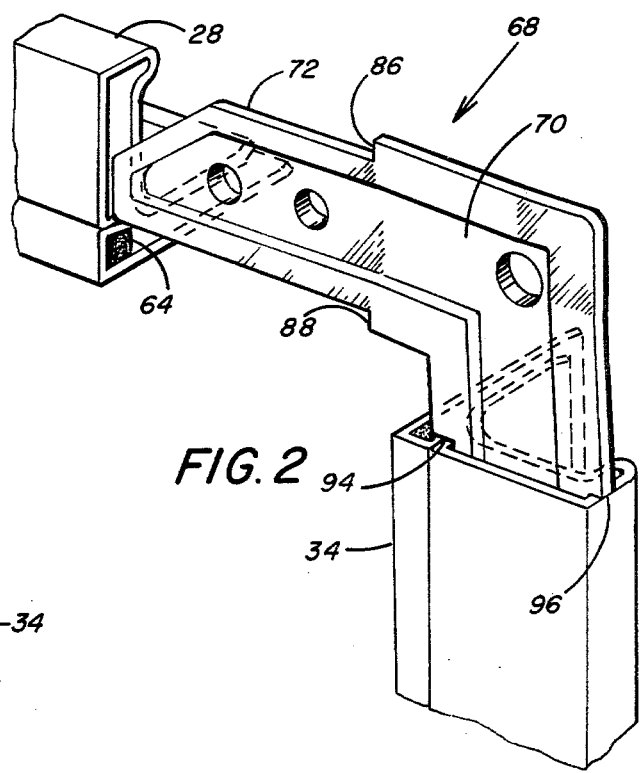
FIG. 2 is an enlarged perspective view of the angular corner end piece and the adjacent flange portions.
Figure 4:
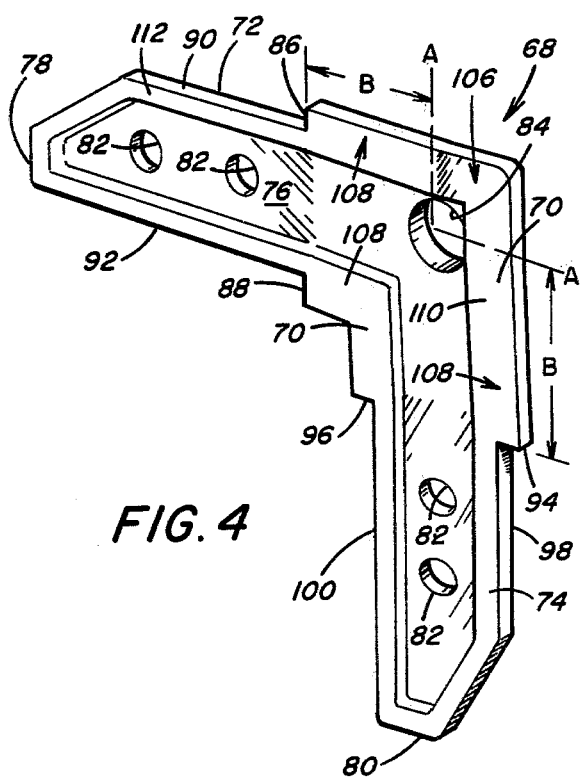
FIG. 4 is a perspective view of the angular corner piece illustrating the angular displacement of the legs and the concave recessed portion.
Figure 5:
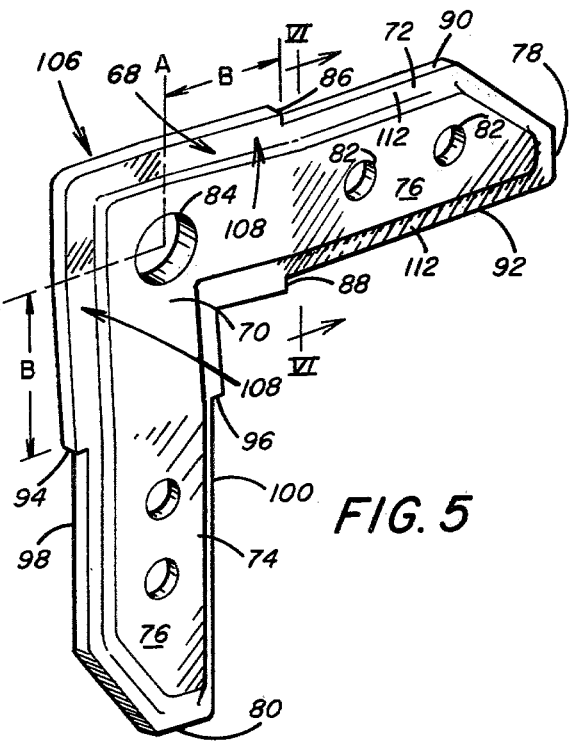
FIG. 5 is a perspective view of the opposite face of the angular corner piece illustrated in FIG. 4.

Referring to the drawings and particularly to FIGS. 1, 2 and 3 there is illustrated an end portion of a duct generally designated by the numeral 10 that has an upper duct wall 12, a lower duct wall 14 and a pair of vertical duct sidewalls 16 and 18. The duct 10 is formed into the configuration illustrated with a longitudinally extending sealed corner joint 20 between the lower duct wall 14 and the sidewall 16.

As illustrated in FIG. 3, the duct upper wall 12 terminates in an end portion 22 and the duct sidewall 18 terminates in an end portion 24. It should be understood, although not shown, that the other duct walls 14 and 16 terminate in similar end portions so that the end portions of the duct 10 extend along a plane transverse to the longitudinal axis of the duct 10. The duct 10 is preferably fabricated from galvanized sheet metal and may have various thicknesses. For example, commercial grade 20 gauge duct has a thickness of between 0.906 and 1.106 millimeters. The galvanized surface of the duct walls also provides a relatively irregular surface so that the thickness of the sheet metal forming the duct 10 is not uniform along the duct end portions.

The end portions of a pair of ducts similar to duct 10 are secured to each other by a pair of frame members generally designated by the numeral 26. The frame members 26 are similar in construction and are secured to the ends of adjacent duct sections and are connected to each other by bolts as later discussed. The frame 26 includes an upper flange portion 28, a lower flange portion 30 and a pair of side flange portions 32 and 34. The configuration of the flange portions 28–34 are the same and are preferably severed to a preselected length from an elongated sheet metal strip that has been roll formed into the flange configuration illustrated in the drawings. Throughout the specification, the flange portions 28 and 34 and the connection therebetween will be discussed in detail. It should be understood, however, that the other flange portions are similarly connected to the duct end portions and to each other.

The flange portion 28 is illustrated in detail in FIGS. 2, 3, 7 and 8. The flange portion 28 has an upstanding channel shaped leg generally designated by the numeral 36 with a front wall 38 connected to a rear wall 40 by a generally horizontal top wall 42. A shoulder 43 is formed between the walls 40 and 42 to secure a longitudinal clip as later described. Extending laterally at a substantially right angle from the upstanding channel shaped leg 36 is a duct receiving leg generally designated by the numeral 44 which has a bottom wall 46 and a top wall 48. The top wall 48 has an upturned lip portion 50 to permit the end wall of the duct to slide between the respective walls 46 and 48 so that the duct end wall is frictionally engaged between adjacent surfaces of the flange walls 46 and 48.

Figure 7:
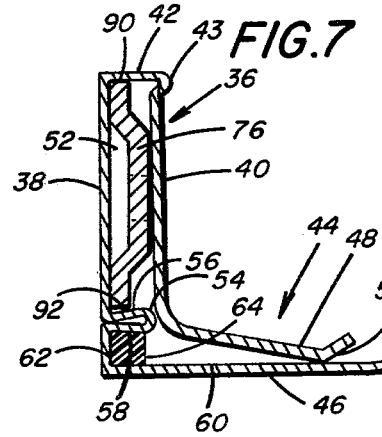
FIG. 7 is a view in section taken along the lines 7—7 in FIG. 1 before the duct end portion is positioned within the flange.
Figure 8:
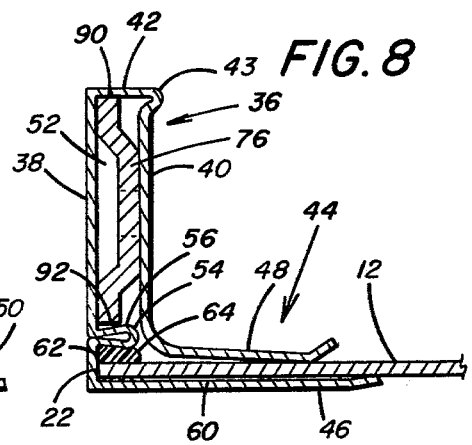
FIG. 8 is a view similar to FIG. 7 and taken along the lines 7—7 of FIG. 1 illustrating the flange portion connected to the duct end wall.

In roll forming the profile of the flange portions, the walls 38 and 40 of upstanding leg 36 are spaced from each other by the top wall 42 to provide a longitudinally extending cavity or opening 52 for receiving the legs of the angular corner pieces as later described. The outer vertical wall 38 has an inturned rebent portion generally designated by the numeral 54 that extends inwardly into the opening 52 into close proximity with the inner surface of vertical wall 40. As illustrated in FIGS. 7 and 8, the inturned portion 54 has a tear drop configuration in side elevation with an upper leg 56 and a lower leg 58. The legs 56 and 58 extend angularly from the vertical wall 38 and form an acute angle therewith. The lower leg 58 of inturned portion 54 is spaced upwardly from and extends toward the inner surface 60 of the lower horizontal wall 46 to form therebetween a pocket generally designated by the numeral 62.

Suitable gasket material 64, such as foam rubber, polyethylene or the like is positioned in the pocket 62 and is maintained therein by the angular relation of wall 58 of inturned portion 54 and the lower horizontal wall 46. The gasket 64 may be of any suitable material that remains flexible for a substantial period of time and will provide an air seal between adjacent metal surfaces. Although preformed or preshaped gasket material, such as foam rubber, polyethylene or the like has been described, it should be understood that a paste-like gasket material may be used with equal facility and maintained within the pocket 62.

During the forming of the profile for the flange portions, the inturned portion 54 is first formed in the vertical wall 38 before the horizontal lower wall 46 is bent to a location perpendicular to the vertical walls 38 and 40. For example, the leg 46 may be partially bent to form an angle of about 120° between the vertical wall 38 and horizontal wall 46 as the inturned portion 54 is formed in the vertical wall 38. Thereafter, backing rolls are positioned behind the upper wall 56 of the inturned portion 54 while other rollers bend the horizontal leg 46 into the position illustrated in FIG. 7. Utilization of the back-up roll behind upper wall 56 retains both the tear drop configuration of the inturned portion 54 and further maintains the dimension of the pocket 62 between the lower wall 58 and the horizontal wall 46.

The other vertical wall 40 of the upstanding channel shaped leg 36 extends generally parallel to wall 38 to a location where the inner surface of the vertical wall 40 is slightly below the lower wall 58 of inturned portion 54. The vertical wall 40 at that location is bent to form a juncture with the upper wall 48 of the horizontal flange 44. The upper wall 48 is inclined to and extends into abutting relation with the upper surface of the lower wall 46 which, in turn, is bent upward slightly at its end portion to receive the duct end wall and frictionally engage the duct end wall between adjacent surfaces of walls 46 and 48. The above described configuration permits duct walls of different thicknesses to be utilized and maintained in frictional engagement between adjacent surfaces of the respective walls 46 and 48.

The vertical dimension of the pocket 62 is not critical because of the gasket material 64 positioned therein. The vertical dimension of pocket 62 may be such that it is arranged to receive duct end walls of different thicknesses and the flange portions 28-34 may thus be utilized for joint assemblies on ducts of different wall thicknesses.

It is preferred, as illustrated in the figures, that the duct end walls 22 and 24 be inserted into the pocket 62 through the gasket material until the edge of the duct end wall abuts the inner surface of the vertical wall 38. It should be understood that a seal is obtained when the edge of the duct end wall penetrates the gasket material to form a seal between the underside of the duct end wall and the upper surface 60 of the leg 46.

For illustrative purposes in FIG. 1, a pair of the angular corner pieces 66 are illustrated as having a generally planar configuration and another pair of the angular corner pieces generally designated by the numeral 68 are illustrated as having an angular configuration where the legs are displaced from a section of the body portion. It should be understood that either the planar angular pieces 66 or the angularly displaced angular corner pieces 68 may be utilized with the frame member generally designated by the numeral 26. Preferably, however, all four corner pieces should have the same configuration.

Referring to FIGS. 2, 4, 5, 10 and 11, the angular corner piece 68 with the angular displacement of the legs is illustrated in detail. The angular corner piece 68 has a body portion 70 with legs 72 and 74 extending angularly therefrom. The corner piece 68 has an elongated concave recessed portion 76 that extends from the front edge 78 of the leg 72 to the body portion 70 and continues through the body portion 70 along the other leg 74 to a location adjacent the leg end portion 80.

The legs 72 and 74 have apertures 82 therein to permit dimpling of the frame portions after assembly of the frame member 26. The body portion 70 has a bolt aperture 84 arranged to receive a connecting bolt. The body portion 70 terminates in inwardly extending shoulders 86 and 88 adjacent the outer and inner edges 90 and 92 of leg 72. Similarly, the body portion 70 terminates in shoulders 94 and 96 adjacent the outer and inner edges 98 and 100 of leg 74. The shoulders 86, 88, 94 and 96 are arranged to abut the ends 102 and 104 of flange portions 28 and 34 as illustrated in FIG. 2.

Figure 11:
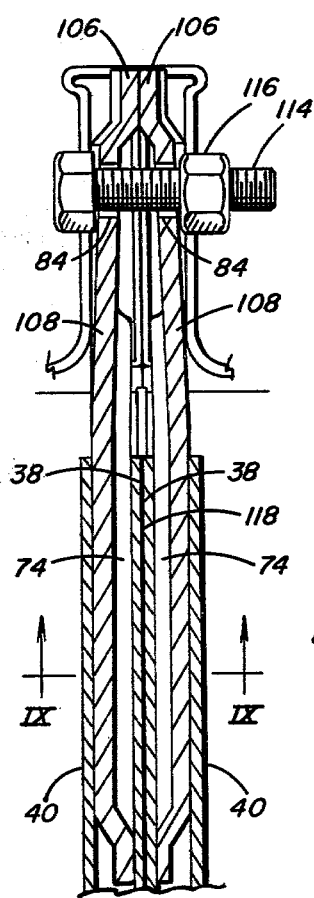
FIG. 11 is a view similar to FIG. 10 illustrating the corner end pieces connected to each other by bolts.

Referring to FIGS. 4, 5, 10, 11 and 12, the angular displacement of the leg portions 72 and 74 from the body portion 70 is illustrated. The body portion 70 has a corner section 106 that extends from the edges of the body portion to a location adjacent the center of bolt aperture 84 and is designated in FIGS. 4 and 5 by the lines A—A. The body portion has an outwardly extending angular portion 108 that extends from the line A—A to the shoulders 86 and 88 and 94 and 96. The length of the angular portions 108 are substantially equal and are designated by the dimension line B. The leg portions 72 and 74 are parallel to the body portion planar section 108 and angularly displaced therefrom preferably a distance slightly greater than the thickness of a wall of the frame portions 28-34. With this arrangement as is illustrated in FIG. 11, when the leg portions 72 and 74 are positioned in the openings 52 of flange portions 28 and 34 and a pair of frames are moved into abutting with each other, the sections 106 of the body portion 70 are in abutting relation with each other while the legs 72 and 74 of the corner piece are spaced from each other approximately the thickness of the pair of the flange portion walls positioned therebetween. When assembled, the corner piece shoulder portions, as illustrated in FIG. 2, abut the edges of the respective flange portions and the straight leg portions 72 and 74 have their entire lengths within the openings 52.

Figure 12:
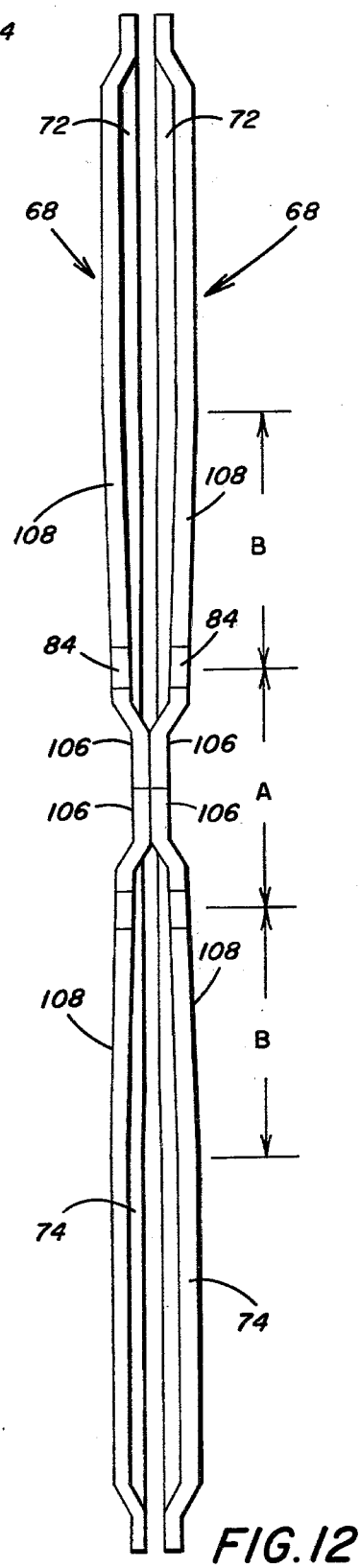
FIG. 12 is a fragmentary orthographic developed view of the angular corner pieces illustrating the manner in which the corner piece body portion is in abutting relation and the ends of the leg portions are spaced from each other.

In assembly, a bolt member 114 is positioned in the aligned apertures 84 of adjacent frames and nut member 116 is threadedly tightened on bolt 114 to urge the angularly extending portions 108 of the corner pieces toward each other to thus urge the leg portions 74 toward each other and thus clamp the walls 38 of the flange portions into abutting relation with a relatively thin gasket 118 positioned therebetween to thus seal the space between the flange walls 38. With this arrangement, the angular displacement of the body portions 108 are fulcrumed at the bolt 114 to urge the corner piece leg portions 74 toward each other. FIG. 12 is a fragmentary developed orthographic view of the corner piece 68 illustrating the space between the respective legs 72 and 74 of both corner pieces 68 when the sections 106 of the body portions are in abutting relation. The space between the respective legs 72 and 74 of both corner pieces 68 is substantially equal to the thickness of the pair of frame portion walls 38 positioned therebetween. It will be apparent from FIG. 12 that the bolts 114 extending through apertures 84 exert a clamping force on the angularly displaced legs 72 and 74.

Figure 6:
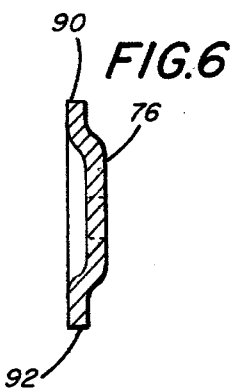
FIG. 6 is a view taken along the lines 6—6 in FIG. 5 illustrating in section the configuration of the angular corner piece leg portion.

As illustrated in FIG. 6, the leg 72 of corner piece 68 has a concave portion 76 and upper and lower edges 90 and 92. When the leg 72 is positioned in the opening 52 of flange portion 28 as illustrated in FIG. 7, the upper edge 90 of leg 72 abuts the undersurface of the horizontal wall 42 and the lower edge 92 abuts the upper wall 56 of the inturned rebent portion 54. The outer surface of the concave portion 76 abuts the inner surface of the rear wall 40 while the remaining portions of the leg abut the inner surface of the front wall 38. With this arrangement, the leg of the corner piece abuts the surfaces of both the front and rear wall in the cavity 52 and the upper edge 90 abuts the horizontal wall 42 while the lower edge abuts a surface of the rebent portion upper leg 56. This provides a rigid, sturdy connection between the corner piece leg portion and the flange portion that is not likely to be tortionally distorted.

It should be understood that angular corner pieces similar to planar angularly corner pieces 66 may be used in lieu of the angularly displaced corner pieces 68 previously described. With the planar corner pieces, the body portion 70 of adjacent corner pieces are spaced from each other a distance substantially equal to the thickness of flange portion outer walls 38. The bolt and nut connecting means 114 and 116, however, urge the body portions toward each other to thus urge the legs 72 and 74 toward each other.

Figure 9:
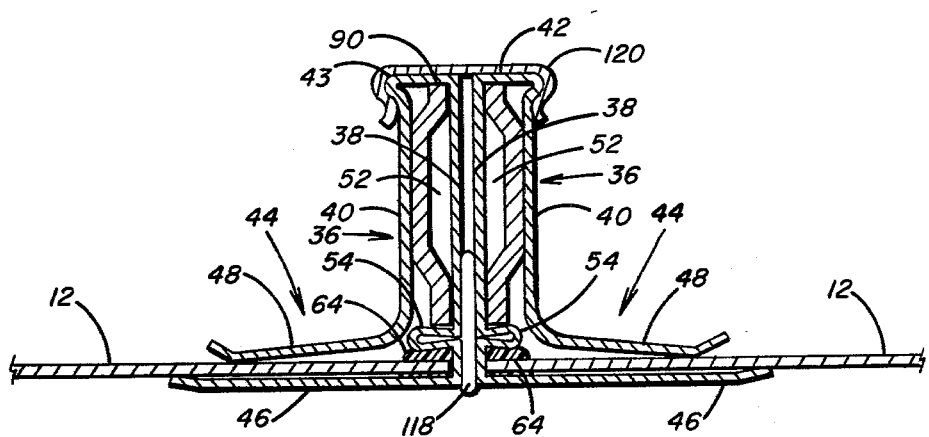
FIG. 9 is a view in section illustrating the end portions of adjacent duct walls secured to each other by flange portions with a gasket therebetween and a clip member positioned thereon.
Figure 10:
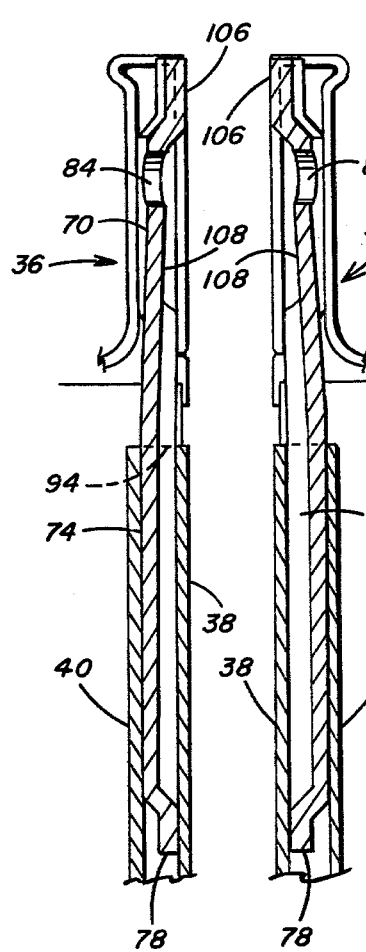
FIG. 10 is a view in section and in elevation of a fragmentary portion of a pair of ducts illustrating the angular deformation of the angular corner pieces.

As previously described and illustrated in FIG. 9, the upstanding channel shaped leg has a horizontal top wall 42 and a vertical rear wall 40 with a longitudinally extending shoulder portion 43 at the juncture of the respective walls. The shoulder portion is a securing means for the longitudinal clip 120 that is positioned over the abutting flange portions as illustrated in FIG. 9 to urge the respective upstanding channel shaped leg portions 36 toward each other.

The frame members 26 are formed by first cutting preselected lengths of the strips having preformed flange portion profiles. For example, frame portions 28, 30, 32 and 34 are cut from a strip of the flange shaped profile. Four corner pieces either planar corner pieces similar to corner pieces 66 or the angular corner pieces 68 have their leg portions 72 and 74 inserted in the openings 52 in the respective upstanding channel shaped legs 36 so that they extend into the openings 52 their entire length with shoulders 86, 88, 94 and 96 abutting the edges of the respective flange portions. With the corner pieces secured in the openings, a generally rectangular frame 26 is then secured to the end of the duct 12 by passing the duct walls 12-18 between the receiving legs 46 and 48 of the duct receiving legs 44. The flange portions 28-34 are urged onto the end portion of the respective duct walls 12-18 until the duct end wall portions similar to end portions 22 and 24 penetrate the gasket member 64 and abut the inner surface of the frame portion vertically extending wall 36. The gasket material displaced by the duct walls extrudes outwardly around the upper and lower surfaces of the duct wall to seal the end portion of the duct wall into the respective pocket in the flange portion. A portion of the gasket material extrudes longitudinally beyond the edges of the flange portions between the respective corner piece shoulder portions and the flange end portions to provide a seal therebetween. Thereafter, the top wall 48 of the duct receiving flange leg 44 is secured to the respective duct wall by spot welding or other suitable means, such as dimpling or the like, along the length of the respective flange portions.

Pairs of ducts are positioned with the frame members in abutting relation with each other with a suitable relatively thin gasket means 118 between the upstanding channel leg front walls 38 and between the front surfaces of the end pieces 66 or 68. Bolts 114 are then inserted through the respective apertures 84 and nuts 116 are threadedly secured thereto to thus secure the end pieces to each other and, in turn, secure the respective frame members 26 to each other with the ducts 10 secured thereto.

With this arrangement, the frame members 26 provide a joint assembly for securing the duct members 10 to each other and to form an air tight seal therebetween. The configuration of the flange portions permits duct members having walls of different thicknesses to be utilized with frame portions having the same dimension. The ends of duct walls extend into the gasket member 64 and thus provide an air tight seal which prevents air from within the duct flowing between the underside of the duct wall and the upper side of the duct receiving leg and around the duct end wall and from between the upper surface of the duct wall and the undersurface of the leg 48. The gasket member 64 will also form an air tight seal where the surfaces of duct walls or the walls of the frame portions are irregular due to the coating applied to the surface during the galvanizing operation.

The configuration of the angular corner pieces, i.e., the recessed portion 76, provides a rigid connection between the flange portion and the corner pieces which is not readily distortable especially after assembly. The bolts exert a pressure on the recessed portion of the angular corner piece leg portions to urge the leg portions into engaging relation with the inner walls of the opening to rigidly secure the leg portions thereon. Where desired, the frame portions may be dimpled to deform the flange portion front and rear walls to extend into the apertures 82 or other means may be employed to form a more rigid connection.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A flange type duct joint assembly to connect the end portions of generally rectangular ducts comprising,
   a plurality of flange portions connected to adjacent flange portions by angular corner pieces to form a generally rectangular frame,
   said flange portions having an upstanding channel shaped leg portion with a front wall and a rear wall forming a longitudinal opening therebetween,
   said flange portions having a duct receiving leg portion with a top wall and a bottom wall, said top wall abutting said bottom wall and arranged to receive an end portion of a duct therebetween, said bottom wall extending angularly from said upstanding channel shaped leg portion front wall,
   said angular corner pieces each including a body portion and a pair of leg portions connected to said body portion,
   said leg portions being displaced angularly from said body portion and positioned in parallel relation to said body portion so that said body portions of adjacent corner pieces of the assembly are in abutting relation while said adjacent pairs of leg portions are spaced from each other a distance substantially equal to the thickness of said flange portions front wall,
   said angular corner pieces each having a concave recessed portion extending longitudinally in said leg portions to thereby form a first planar surface displaced in parallel relation to a second planar surface,
   said first planar surface being positioned in abutting relation with a portion of said flange portion front wall and being removed from abutting relation with the remaining portion of said flange portion front wall,
   said second planar surface being positioned in abutting relation with a portion of said flange portion rear wall and being removed from abutting relation with the remaining portion of said flange portion rear wall,
   connecting means extending through adjacent corner pieces for connecting the end portions of the generally rectangular ducts,
   said connecting means being adapted upon tightening to exert a clamping force on said body portions of adjacent corner pieces and to exert pressure on said concave recessed portions to urge said first planar surfaces toward each other and thereby concentrate the application of sealing forces upon said portion of said flange portion front wall to increase the sealing forces applied to said flange portions at said corner pieces, and
   paste like gasket material positioned in said upstanding channel shaped leg portion longitudinal opening in abutting relation with said duct receiving leg bottom wall and with the inner surface of said channel shaped leg portion, said paste like gasket material adapted to be positioned between said duct end portion and the upper surface of said duct receiving leg bottom wall to sealingly connect said duct end portion to said frame flange portion.

2. A flange type duct joint assembly to connect the end portions of generally rectangular ducts as set forth in claim 1 in which,
   said duct end portion extending through said paste like gasket material into abutting relation with the inner surface of said channel shaped leg portion outer wall.

3. A flange type duct joint assembly to connect the end portions of generally rectangular ducts as set forth in claim 1 in which,
   said upstanding channel shaped leg portion front wall includes a longitudinally extending inturned rebent portion extending into said longitudinal opening,
   said paste like gasket material abutting said inturned rebent portion with said duct end portion positioned between said duct receiving leg bottom wall and said inturned rebent portion of said upstanding channel shaped leg portion front wall with said paste like gasket material positioned between the upper and lower surfaces of said duct end portion, said duct receiving leg bottom wall and said rebent portion.

4. A flange type duct joint assembly to connect the end portions of generally rectangular ducts as set forth in claim 3 in which,
   said inturned rebent portion having a tear drop configuration in elevation with an upper leg and a lower leg, said upper and lower legs diverging from each other and extending at acute angles from said upstanding channel shaped leg portion front wall, said lower leg extending downwardly toward said duct receiving leg bottom wall, said inturned rebent portion lower leg arranged to maintain said paste like gasket material in abutting relation with said duct receiving leg bottom wall.

5. A flange type duct joint assembly to connect the end portions of generally rectangular ducts as set forth in claim 3 in which,
   said inturned rebent portion of said upstanding channel shaped leg portion of said duct receiving leg bottom wall forming a pocket therebetween for receiving said paste like gasket material therein.

6. A flange type duct joint assembly as set forth in claim 1 which includes,
   said angular corner pieces each including a pair of intermediate angular portions, said intermediate angular portions extending between said body portion and said pair of leg portions respectively to thereby connect said body to said respective pair of leg portions so that said pair of leg portions are parallel to said body portion and angularly displaced therefrom a distance substantially equal to the thickness of said flange portions front wall.

7. A flange type duct joint assembly as set forth in claim 4 in which said angular corner pieces include, said corner piece concave recessed portions each having an upper longitudinal edge portion and a lower longitudinal edge portion, said upstanding channel shaped leg portion having a horizontal top wall connecting said front wall and said rear wall, and said upper leg portion arranged to abut the inner surface of said channel shaped leg horizontal wall and said lower edge portion arranged to abut the upper leg of said inturned rebent portion to thereby provide a rigid connection of said pair of corner piece leg portions with said respective flange portion.

8. A flange type duct joint assembly as set forth in claim 1 which includes, said body portion having a planar corner section and angular portions extending from said planar corner sections to said leg portions, said leg portions having a planar configuration extending parallel to and spaced from said body portion planar corner section.

9. A flange type duct joint assembly to connect the end portions of generally rectangular ducts comprising, a plurality of flange portions connected to adjacent flange portions by angular corner pieces to form a generally rectangular frame, said flange portions having an upstanding channel shaped leg portion with a front wall and a rear wall forming a longitudinal opening therebetween, said flange portions having a duct receiving leg portion with a top wall and a bottom wall, said top wall abutting said bottom wall and arranged to receive an end portion of a duct therebetween, said bottom wall extending angularly from said upstanding channel shaped leg portion front wall, said upstanding channel shaped leg portion front wall includes a longitudinally extending inturned rebent portion extending into said longitudinal opening, said inturned rebent portion having a tear drop configuration in elevation with an upper leg and a lower leg, said upper and lower legs diverging from each other and extending at acute angles from said upstanding channel shaped leg portion front wall, said lower leg extending downwardly toward said duct receiving leg portion bottom wall, said lower leg being spaced from said duct receiving leg portion bottom wall, said upper leg and said lower leg each having a first end portion positioned in overlying, abutting relation at said upstanding channel shaped leg portion front wall, said upper leg and said lower leg each having a second end portion being connected and positioned closely adjacent to said upstanding channel shaped leg portion rear wall to form a pocket that facilitates sealing engagement of the ends of the respective ducts to said flange portions to minimize air leakage between the ends of the ducts and said flange portions, said angular corner pieces each including a body portion and a pair of leg portions connected to said body portion, said leg portions being displaced angularly from said body portion and positioned in parallel relation to said body portion so that said body portions of adjacent corner pieces of the assembly are in abutting relation while said adjacent pairs of leg portions are spaced from each other a distance substantially equal to the thickness of said flange portions front wall, connecting means extending through adjacent corner pieces for connecting the end portions of the generally rectangular ducts, said connecting means being adapted upon tightening to exert a clamping force on said body portions of adjacent corner pieces and to urge adjacent corner pieces toward each other and thereby concentrate the application of sealing forces upon said flange portion front walls, and said upstanding channel shaped leg portion having a vertical inner wall intersecting the top wall of said duct receiving leg, said intersection of said respective walls being located at substantially the same elevation as said rebent portion lower leg.

* * * * *